April 3, 1962    H. A. LEONARDSON    3,027,641
COMBINATION PLANE, SCRAPER AND CUTTER
Filed Nov. 1, 1960
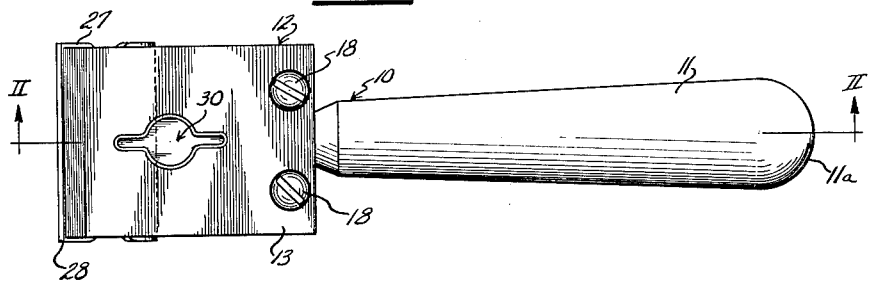
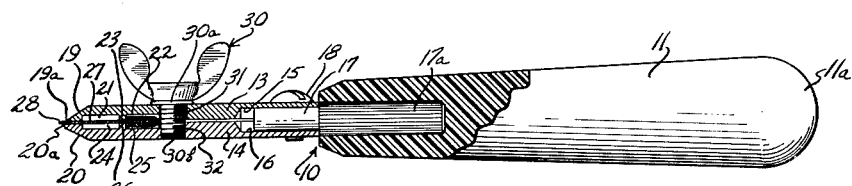
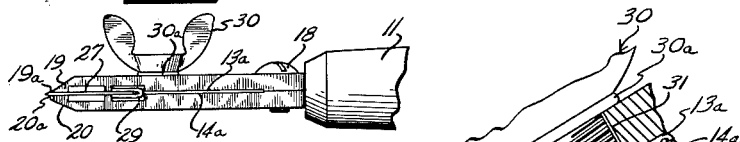
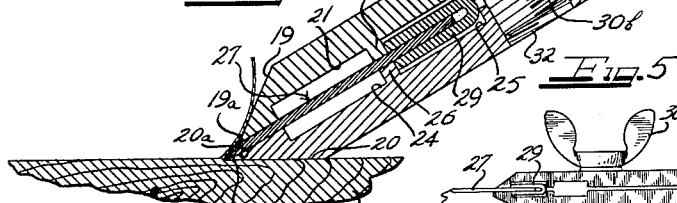
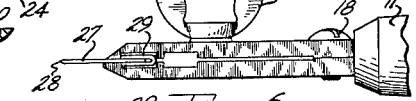
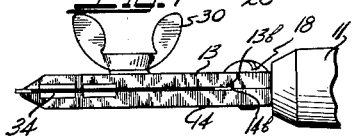
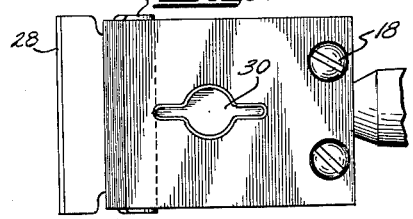
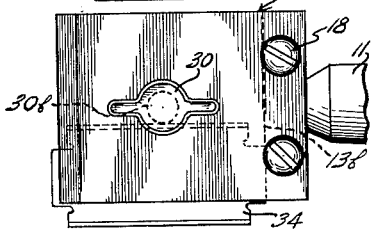
Inventor
HENNING A. LEONARDSON

United States Patent Office 3,027,641
Patented Apr. 3, 1962

3,027,641
COMBINATION PLANE, SCRAPER AND CUTTER
Henning A. Leonardson, 234 Pinehurst Drive,
Des Plaines, Ill.
Filed Nov. 1, 1960, Ser. No. 66,527
4 Claims. (Cl. 30—329)

The present invention relates to a combination plane, scraper and cutter construction and more particularly to a hand tool having a replaceable blade which may be moved to varying positions so that the tool may be employed as a plane, a scraper, or as a cutter as desired.

The present invention provides means for retaining a disposable blade, such as a razor blade, in any one of a plurality of selected positions so that the device may be employed to fulfill the functions of a plurality of tools. In general, the tool comprises a handle secured to a blade holder including a pair of clamping jaws and means for clamping the jaws together with a blade secured therebetween. The jaws are provided with complementary spaced recesses and ridges which are adapted to receive the blade, the clamping means serving to secure the blade in relatively adjusted position.

One of the blade holding jaws is provided with an inclined terminal face for contacting the workpiece directly behind the cutting edge of the blade, with the plane of the face being so formed that a projection of the plane face meets the cutting edge of the blade. Thus, one of the cutting elements is provided with a guiding face directly adjacent thereto for contacting the workpiece to guide the cutting blade into engagement therewith to take a cut of predetermined depth. That terminal jaw face directly overlying the blade cutting edge is so inclined that it contacts the blade across the entire edge so that it effectively deflects shavings away from the cutting edge, preventing jamming of the blade during use. In this manner, the hand tool of the present invention may serve efficiently as a plane equipped with a replaceable blade for taking a cut of predetermined depth, and the chips or shavings from the workpiece are deflected from the cutting edge in use.

The blade may be moved to a second position between the blade holding jaws and retained therein to extend well beyond the clamping elements. When retained in this manner, a considerable length of blade is exposed and the entire cutting edge extends ahead of the remainder of the tool in use so that the cutting blade may efficiently serve as a scraper.

A single edge blade may be positioned in still a third position between the clamping jaws to extend beyond the sides thereof to serve as a cutting or knife blade. When the blade is employed adjusted to this position, force may be applied to the opposite side of the blade retaining jaws to force the knife edge into the workpiece to be cut, thus insuring the severance of a relatively thick workpiece upon a single slicing movement of the blade.

Either single or double-edged razor blades may be employed with the tool of the present invention as the cutting element in the first and second positions. In either case, only that edge of the blade actually being employed at the time is exposed beyond the clamping jaws, thus insuring safety in operation. When a single-edged blade is employed, the blade may be reversed so that the cutting edge is not exposed beyond the blade holding element.

It is, therefore, an important object of the present invention to provide an improved type of combination plane, scraper, and cutter in which the various functions of the device may be carried out by merely changing the position of the cutting edge relative to the device as a whole.

A further important object of the present invention is to provide a hand tool in which a conventional single or double edged razor blade is clamped between a pair of jaws formed with cooperating ridges and depressions for securely clamping the blade therebetween in a plurality of adjustable positions so that the device may be employed as a plane, a scraper, and as a cutter at the option of the user.

It is a further important object of the present invention to provide a hand tool in which a razor blade is clamped between a pair of cooperating jaws with its cutting edge extending therebeyond, one of the jaws having a plane guiding face for contacting the workpiece, the guiding face being so formed that a projection of the face intercepts the cutting edge of the blade so that the cutting edge is guided into contact with the workpiece to remove a cut of predetermined depth.

A still further important object of the present invention is to provide a combination plane, scraper, and cutter having a handle portion, a pair of jaws having cooperating grooves and ridges formed therein and clamping means for clamping the jaws together with a razor blade disposed therebetween, the razor blade being maintained in position between the clamping elements by the cooperating grooves and ridges formed therein with the cutting edge of the blade being movable to any one of a plurality of adjusted positions to serve as a plane edge, as a scraping edge, or as a cutting edge upon mere loosening of the clamping jaws and adjustment of the blade.

Other objects and advantages will become more apparent with the teaching of the principles of the invention in connection with the disclosure of the preferred embodiments thereof in the specification, claims and drawings, in which:

FIGURE 1 is a top plan view of a combination plane, scraper, and cutter of the present invention;

FIGURE 2 is a cross-sectional view with parts shown in elevation taken along the plane II—II of FIGURE 1;

FIGURE 3 is a fragmentary side elevational view of the device of FIGURE 1;

FIGURE 4 is an enlarged fragmentary cross-sectional view, with parts shown in elevation, similar to FIGURE 2 and showing the operating position of the device when employed as a plane;

FIGURE 5 is a fragmentary side elevational view similar to FIGURE 3 and showing the blade of the device in an adjusted position for use as a scraper;

FIGURE 6 is a top plan view of the device in its adjusted position of FIGURE 5;

FIGURE 7 is a fragmentary side elevational view of the device showing the cutting blade in still another adjusted position to serve as a cutting knife or chopper; and FIGURE 8 is a top plan view of the device in the adjusted position of FIGURE 7.

As shown on the drawings:

In FIGURE 1, reference numeral 10 refers generally to a combination plane, scraper, and cutter of the present invention, the device has a handle 11 of circular cross-section and increasing in diameter along its length to a rounded end 11a. The handle 11 is preferably molded of suitable material, such as plastic, metal, wood or the like, and a blade holder 12 is mounted on the small diameter end of the handle.

The blade holder 12 comprises a pair of cooperating metal clamping jaws consisting of top jaw 13 and bottom jaw 14. The jaws 13 and 14 are provided with complementary semicylindrical recesses 15 and 16 extending inwardly from the rear edges of the jaws midway between the sides thereof and cooperating to form a cylindrical bore receiving one end of a pin 17. The opposite end of pin 17 is firmly embedded in the small diameter end of the handle 11, the embedded portion of the pin 17 being knurled as at 17a to insure its retention by handle 11. The clamping jaws 13 and 14 are secured together by suitable means, as by screws 18 disposed on either side of the pin 17 adjacent the rear end edges of the jaws.

As best shown in FIGURES 3 and 4, the mating faces 13a and 14a of clamping jaws 13 and 14 are slightly recessed or relieved forwardly of the screwed-together rear end edges thereof so that a gap is provided therebetween along most of the lengths thereof. This may be accomplished in another way, by omitting the recessing at 13a and 14a and having the surfaces flat with thin washers positioned between the surfaces at the location of the screws 18 so that the screws pass through the washers.

The forward edges of the jaws 13 and 14 are beveled rearwardly from the mating faces of the jaws as at 19 and 20, respectively, to provide inclined top and bottom guiding faces. The top face 19 is inclined at a constant angle of substantially 45° with respect to the plane of the blade across the entire width of the jaw 13 and has a thin front edge 19a, while face 20 has a thicker or more blunt front edge 20a which extends longer than the edge 19a. The function of these guiding faces 19 and 20 and the relationship of their front edges 19a and 20a will be hereinafter more fully explained.

I also contemplate that the lower jaw 14 may be formed with a face 20 coming to a thin front edge at the location 20a similar to the construction of the upper face 19. The face 20 of the jaw is milled to substantially a 20° angle with respect to the plane of the blade. Also the top jaw must be approximately 1/32" shorter than the bottom jaw 14, so that the almost sharp edge of the top jaw is slightly back of the beveled sharp edge of the single edge razor blade when assembled. In this position, when used for planing wood, the chips or shavings roll off smoothly. Otherwise shavings will jam up.

Jaw 13 is provided with a pair of closely spaced transverse grooves or recesses 21 and 22 (FIGURES 3 and 4) extending completely across the width of the jaw 13 in a direction parallel to the edge 19a. Recesses 21 and 22 are separated by a rib 23 terminating in the same plane as the face 13a.

Jaw 14 is provided with a similar pair of transverse grooves or recesses 24 and 25 complementary to recesses 21 and 22 of jaw 13, the recesses 24 and 25 being separated by a rib 26 terminating in the plane of face 14a.

The clamping jaws 13 and 14 thus cooperate to define a pair of transverse slots or recesses of rectangular cross-section extending completely across the width of each member, the recesses being open at their ends.

A razor blade 27, of the single-edged variety as shown in FIGURES 1–6 of the drawings, may be inserted between the clamping elements 13 and 14 to provide the sharpened cutting edge of the device of the present invention. Razor blade 27 is provided with a sharpened honed edge 28 and with an opposite strengthening and backing member 29 of U-shape cross-section.

The transverse slots formed by the complementary recesses 21—22 and 24—25 are of such width as to have their longitudinal edges in very closely spaced relationship to the parallel extremities of rib 29 as best shown in FIGURES 2 and 4 of the drawings. The strengthening rib 29 is thus guided by the slots and prevents pivoting movement of the blade between the clamping jaws 13 and 14.

The blade is securely clamped between the jaws 13 and 14 by means of wing screw 30 having a shoulder 30a overlying jaw 13 and a threaded shank 30b extending freely through aperture 31 formed in the top jaw 13 and threaded into the threaded aperture 32 in the bottom jaw 14. When the screw 30 is tightened its shoulder 30a and the portion of its shank 30b which is threaded into jaw 14 cooperate to draw the jaws together causing them to flex from their screwed-together rear ends to their front edges for closing the gap formed between the mating recessed faces 13a and 14a. When the blade backing rib 29 is in the rear slot defined by grooves 22 and 25 the cooperating ribs 23 and 26 will clamp against opposing side surfaces of blade 27 along a line intermediate the sharpened honed edge 28 and the reinforcing rib 29 thereof. At the same time the mating faces 13a and 14a of the jaws will clamp against the blade just rearwardly of the sharpened edge 28.

It is contemplated that instead of the wing screw, a metal screw inserted into a plastic knob about 1 1/4" in diameter may be used.

Such a metal screw would be threaded in the same manner as the wing screw 30. However, instead of the wings, a generally cylindrically shaped knob would be provided, which is handy for gripping from any position.

Thus, when employed as a plane as illustrated in FIGURES 1–4, inclusive, the blade is reinforced at a plurality of points along its width and entirely across its length by the cooperating clamping jaws 13 and 14.

The function of guiding faces 19 and 20 is clearly illustrated in FIGURE 4 in which the device 10 is employed as a plane for shaving a thin layer of wood or the like material from workpiece 33. As best shown in this figure, guiding face 20 is disposed at such an angle that the projection of this surface intercepts blade 27 at a point coincident with the cutting edge 28. Preferably, the edge 20a of this face 20 overlaps the honed bevel edge 28 of the blade. The angle between face 20 and the longitudinal median line of blade 27 is preferably within the range of from 20° to 40°, with an angle of 30° being suitable for most uses. Thus, when guiding face 20 is maintained in contact with workpiece 33 during the planing operation, a uniform cut of predetermined depth is taken from the workpiece. The shavings produced upon the taking of the cut are guided by the top face of the beveled honed cutting edge 28 into contact with the top inclined faced 19 of jaw 13. As best shown in FIGURE 4, the thin front edge 19a of face 19 is rearwardly of the honed bevel edge 28 in uniformly tight contact with the blade 27, therefore, no gaps between the top jaw and blade are present and there is no possibility of shavings becoming wedged between the jaw 13 and blade 27.

When it is desired to employ the device of the present invention as a scraper, it is preferred that the blade 27 be moved from its position as illustrated in FIGURES 2 and 4 to the position illustrated in FIGURE 5, that is with the reinforcing rib 29 in the forward slot formed by jaw recesses 21 and 24. By so moving the blade, the blade is still reinforced by the mating jaw faces 13a and 14a as hereinbefore described with the blade extending well beyond the extremity of members 13 and 14 to a distance greater than that illustrated in FIGURES 2 and 4. The advantages residing in the present invention when employed as a scraper will be evident to those skilled in the art from the fact that the blade can flex and its entire sharpened edge 28 is exposed in advance of the remainder of the device so that the scraper may extend into corners, recesses and the like which cannot be reached by conventional scrapers.

As shown in FIGURES 7 and 8, a double-edged razor blade 34 is used as a knife or chopper. The blade 34, as is shown in FIGURE 7, is disposed between jaws 13 and 14 to extend into the sides thereof. The blade 34 is guided at one end by the shoulders 13b and 14b at the rear ends of the mating jaw faces 13a and 14a and abutting relation between this end and the shoulders will prevent tilting of the blade. The blade is securely clamped by the mating jaw faces and if desired can be bottomed against the screw shank 30b.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A razor blade hand tool adapted for planing, scraping and cutting comprising top and bottom jaw plates having spaced mating clamping faces, a handle attached to the rear end of the plates, the bottom jaw plate having a beveled forward end face terminating in a blunt edge underlapping the honed edge of a razor blade, said top jaw plate having a beveled forward end face terminating in a sharp edge behind the sharp edge of the blade, and means for drawing said mating faces together to clamp a razor blade between said jaws.

2. A razor blade hand tool adapted for planing, scraping and cutting comprising top and bottom jaw plates having spaced flat surfaced mating clamping faces, a handle attached to the rear end of the plates, the bottom jaw plate having a beveled forward end face terminating in a blunt edge underlapping the honed edge of a razor blade, said top jaw plate having a beveled forward end face terminating in a sharp edge behind the sharp edge of the blade and behind the blunt edge of said bottom jaw plate, said plates being of the same thickness and being identical except for said end faces, and means for drawing said mating faces together to clamp a razor blade between said jaws.

3. In a hand tool having a handle portion and cooperating clamping jaws secured to said handle portion for receiving a removable blade therebetween with the blade edge extending therebeyond, means for guiding said blade edge into contact with a workpiece to take a cut of predetermined depth, comprising a plane guiding face formed integrally with one of said clamping jaws and having a blunt forward edge, said guiding face being formed at an angle of from 20° to 40° to a longitudinal median plane of said blade and terminating short of the cutting edge of said blade while contacting a portion of the honed blade surface to reinforce the same, the plane of said guiding face being so formed that a projection thereof intercepts the cutting edge of said blade to guide said cutting edge into contact with said workpiece to take a cut of predetermined depth therefrom.

4. A razor blade hand tool adapted for planing, scraping and cutting comprising top and bottom jaw plates having spaced mating faces extending forwardly from shoulders adjacent the rear end edges thereof and a plurality of transverse grooves parallel to the front end edges thereof, means for locking together the rear ends of the plates to position the grooves in aligned relation to form front and rear transverse slots between the jaw plates to selectively receive the backing rib of a razor blade, a handle attached to the rear ends of the plates, the bottom jaw plate having a beveled forward end face terminating in a blunt edge underlapping the honed zone of a single-edged razor blade when the rib thereof is seated in the rear groove and having an angle for holding the honed edge in planing position when said face is bottomed on a workpiece, said top jaw plate having a beveled forward end face terminating in a sharp edge behind the honed zone of the thus positioned blade, and means for drawing said mating faces together to clamp a razor blade in selected positions in said slots and against said shoulders.

References Cited in the file of this patent
UNITED STATES PATENTS

| | | |
|---|---|---|
| 271,219 | Campbell | Jan. 30, 1883 |
| 1,331,280 | Schade | Feb. 17, 1920 |
| 1,518,100 | Nighbert | Dec. 2, 1924 |
| 1,903,877 | Potter | Apr. 18, 1933 |
| 2,048,603 | Fancher | July 21, 1936 |
| 2,236,323 | Stachowiak | Mar. 25, 1941 |
| 2,308,162 | Frank | Jan. 12, 1943 |
| 2,645,259 | Ackland | July 14, 1953 |

FOREIGN PATENTS

| | | |
|---|---|---|
| 802,854 | Great Britain | Oct. 15, 1958 |